(12) United States Patent
Ho et al.

(10) Patent No.: US 8,112,308 B1
(45) Date of Patent: Feb. 7, 2012

(54) TARGETING USING GENERATED BUNDLES OF CONTENT SOURCES

(75) Inventors: Ronald Ho, Fremont, CA (US); Mike Hsin-Ping Liang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 674 days.

(21) Appl. No.: 12/187,036

(22) Filed: Aug. 6, 2008

(51) Int. Cl.
*G06Q 40/00* (2006.01)
(52) U.S. Cl. .......................................... 705/14; 705/35
(58) Field of Classification Search .................... 705/14, 705/35
See application file for complete search history.

(56) References Cited

U.S. PATENT DOCUMENTS

| | | | |
|---|---|---|---|
| 2007/0185777 A1* | 8/2007 | Pyle et al. | 705/26 |
| 2008/0005313 A1* | 1/2008 | Flake et al. | 709/224 |

* cited by examiner

*Primary Examiner* — Thu Thao Havan
(74) *Attorney, Agent, or Firm* — Fish & Richardson P.C.

(57) ABSTRACT

Selections of content sources are received. Content source bundles are generated from the selected content sources, each content source bundle defined by one or more selected content sources assigned to that content source bundle, and each content source bundle having associated data indicative of users interested in content provided by the selected content sources of that content source bundle. The content source bundles are presented for use in advertising campaigns in which advertisements can be published on selected content sources of a content source bundle, and the performance of each content source bundle used in advertisement campaigns are measured.

20 Claims, 6 Drawing Sheets

Available Bundles www.EXAMPLE_URL.com

Gadgets    Search

The following bundles matched your search for "Gadgets"

| Bundle ID | Key Words | Name | |
|-----------|-----------|------|---|
| 100025 | Electronics, Gadgets, ... | Gadget Bundle | Select Bundle |
| 106785 | Video Games, Electronics, ... | Gamerz | Select Bundle |
| 195585 | Gadgets, Soldering, ... | Tech Gurus | Select Bundle |

Bundle Id -- 100025
Author -- gadgetGuy
User Rating - ★★★★ (98 Users)
Key Words -- Electronics, Gadgets, Cell Phones, MP3
Description -- "This website bundle is focused on gadgets and electronics such as cell phones, mp3 players, videogames, and televisions. I have been a gadget collector all of my life and I take yearly vacations to Japan to find the newest and most unusual gadgets."
Active Campaigns - 5
Click-Through Rate for last 6 months -- 21%
Click-Through Rate for last week -- 19%
Average number of hits for pages in bundle last month -- 250,000
Total number of hits last month -- 3,553,098
Total advertisement revenue generated -- $5,000,987

FIG. 5

TARGETING USING GENERATED BUNDLES OF CONTENT SOURCES

FIELD

This disclosure is generally related to content delivery.

BACKGROUND

In contextual advertising systems targeted advertisements are selected and served by automated systems based on, for example, the content displayed on a webpage. The displayed content can be analyzed to determine the "context" of the webpage (e.g., a topic), so that advertisements that best match the determined context can be targeted to the webpage. The context of the webpage can be determined by identifying keywords on the webpage, and/or by referencing a known or previously determined context of the webpage or website hosting the webpage. Once the context of a webpage is determined, one or more advertisements targeted to the determined context can be displayed on the webpage.

Some contextual advertising systems, however, may not readily facilitate the targeting of websites catering to niche interests, or may not be able to identify enough keyword data on certain pages to determine the correct context. Furthermore, some contextual advertising systems may not readily identify related web sites to advertisers for consideration prior to advertising.

SUMMARY

Users familiar with a niche demographic or audience can author content source bundles that contain references to content sources that members of the niche demographic or audience are likely to view. The authors may create the bundles through an Internet based interface by uploading identifiers of content sources, such as URLs, or through a toolbar integrated into a browser.

The generated content source bundles are made available to advertisers to use in targeted advertising campaigns. The content source bundles may be presented to the advertisers along with a description of the target demographic or audience. The bundles may further be presented with performance data that indicates the performance of the content source bundle in targeted advertisement campaigns, and/or the performance of content source bundles created by the same user in previous targeted advertising campaigns, and/or the performance of the content sources referenced the content source bundle with respect to advertisements. The authors of the content source bundles may be compensated based on the performance of their bundles in targeted advertising campaigns.

In one general aspect, one or more content sources are selected. A content source bundle is generated from the selected one or more content sources, the content source bundle is associated with data indicative of users interested in content provided by the selected content sources, and the content source bundle is submitted for use in content placement selection in which content items are displayed in content sources associated with the generated content source bundle based on their inclusion in the content source bundle.

Implementations may include the following features. Submitting the content source bundle for use in advertising content placement may include submitting the content source bundle for use in advertising campaigns, and the content items may be advertisements. Compensation may be received for the use of the content source bundle. The received compensation may be based on the performance of the content source bundle with respect to the advertising campaign. The content sources may be websites, and the performance of the content source bundle may measured by one of the number of clicks received, impressions made, or conversions made attributable to the display of advertisements on the websites associated with the generated content source bundle.

Data indicative of users interested in content provided by the selected content sources may be generated. The data indicative of users interested in content provided by the selected content sources may include keywords. The data indicative of users interested in content provided by the selected content sources is automatically generated based on the content of the one or more content sources.

The one or more content sources may be selected by viewing a content source using a browser, the browser including a toolbar adapted to receive and store content source selections for a content source bundle, the toolbar receiving a indicator of a selection of the viewed content source, and the toolbar storing the viewed content source in response to receiving the indicator of a selection. The content sources may be websites.

In another general aspect, selections of content sources are received. Content source bundles are generated from the selected content sources, each content source bundle defined by one or more selected content sources assigned to that content source bundle, and each content source bundle having associated data indicative of users interested in content provided by the selected content sources of that content source bundle. The content source bundles are presented for use in advertising campaigns in which advertisements can be published on selected content sources of a content source bundle, and the performance of each content source bundle used in advertisement campaigns are measured.

Implementations may include the following features. The content source bundles may be ranked according to the measured performance of each content source bundle. The content source bundles may have associated authors, the content source bundles may be ranked according to the measured performance of other content source bundles associated with the authors. The selected content sources may have performance data, and the content source bundles may be ranked according to the performance data of the selected content sources assigned to the bundles. The associated data indicative of users interested in content provided by the selected content sources may be automatically generated. The associated data indicative of users interested in content provided by the selected content sources may include keywords.

In another general aspect, a content source bundle is identified from a plurality of content source bundles, the identified content source bundle including data indicative of users interested in content provided by the selected content sources that is relevant to a target criterion. The advertising campaign is associated with the identified content source bundle.

Implementations may include the following features. Associating the advertising campaign with the identified content source bundle may include associating the advertising campaign with the identified content source bundle so that when a content associated with the identified content source bundle is requested, an advertisement from the advertising campaign is included in the content delivered in response to the request. A content source bundle owner may be compensated based on the performance of the content source bundle. The content sources may be websites, and performance of the content source bundle may be determined by one of the number of clicks received, impressions made, or conversions made attributable to the inclusion of advertisements on the websites of the content source bundle. Identifying the content source bundles from a plurality of content source bundles may include searching the plurality of content source bundles for a content source bundle that is relevant to the target criterion.

In another general aspect, a toolbar is received. One or more websites are selected using the received toolbar. A content source bundle identifying the selected one or more websites is generated. Data indicative of a target criteria for the generated content source bundle is generated, and the content source bundle is presented to advertisers for selection for use in a targeted advertising campaign according to the target criteria.

Particular implementations of the subject matter described in this specification can be implemented so as to realize one or more of the following advantages. One advantage is the creation of content source bundles to target a particular user group or demographic by users who are familiar with, or are members of, the targeted user group or demographic. Another advantage is the targeting of advertisements to content sources identified in the content source bundle. Another advantage is a content source bundle marketplace where advertisers may select content source bundles to use in targeted advertising campaigns based on target criteria. Another advantage is the creation of a content bundle market by compensating of content source bundle authors based on the performance of the content source bundles in targeted advertising campaigns.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 5 is an example user interface for viewing and selecting content source bundles for use in a targeted advertising campaign.

Like reference numbers and designations in the various drawings indicate like elements.

DETAILED DESCRIPTION

Figure 1:
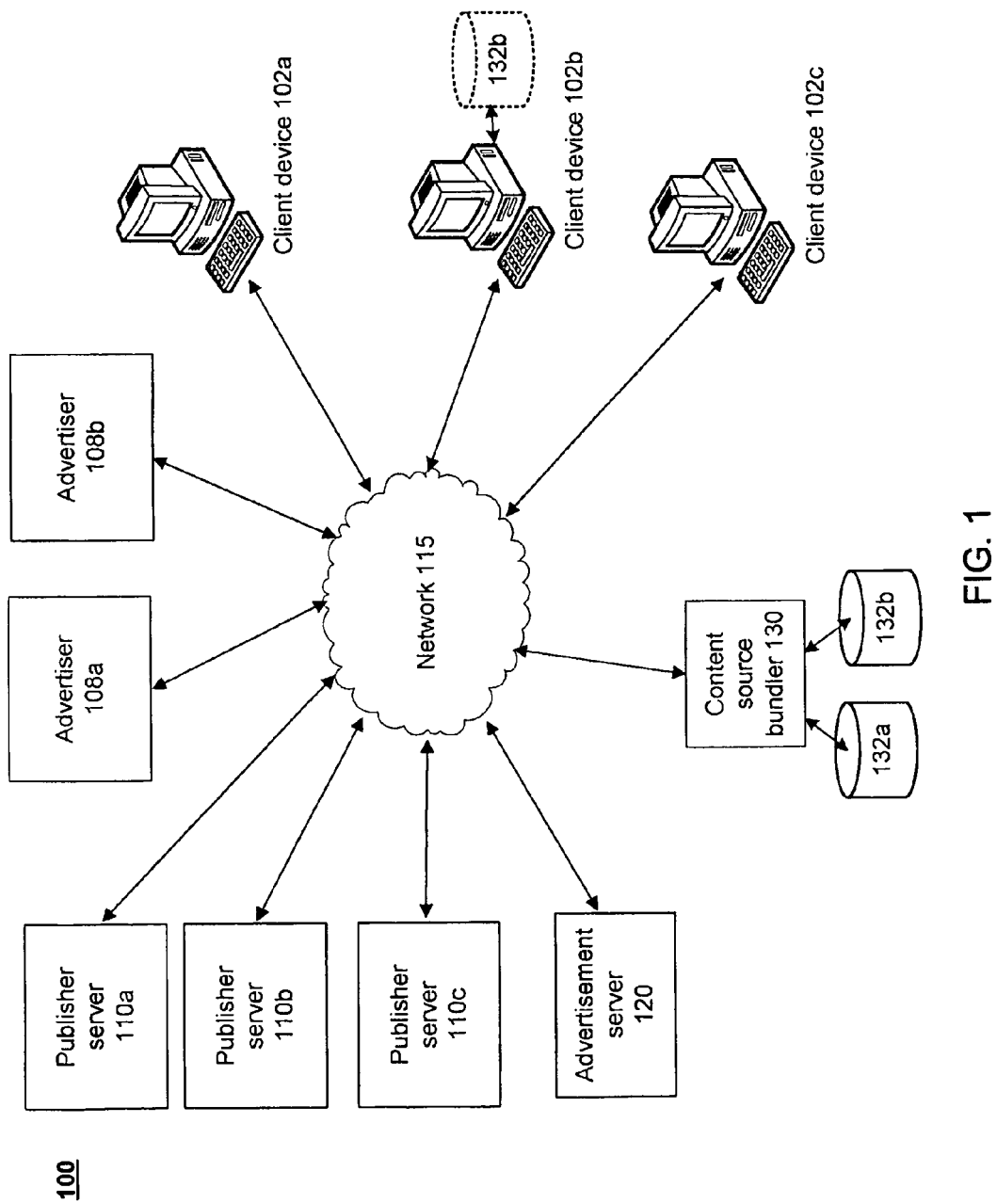
FIG. 1 is an example environment in which a content source bundling system can be used.

FIG. 1 is an example environment 100 in which a content source bundling system can be used. In some implementations, a content source bundle is a collection of identifiers of content sources such as uniform resource locators (URLs) or references to web properties, e.g., websites, on the Internet. In other implementations, the content source bundle may further include references to magazines, newspapers, video games, and other non-online sources. A content source bundle can, for example, be user generated, and be designed to represent the websites and other content sources that users with a particular interest, or of a particular demographic, are likely to frequent. Content source bundles may be created by users who themselves have the particular interest, or are of the particular demographic.

In some implementations, these content source bundles can be used by entities to place targeted content on the web properties and non-online content sources, such as magazines and newspapers, identified by or associated with the bundles. For example, the content source bundles can be used by advertisers in targeted advertising campaigns to place advertisements in webpages and other content sources identified by or associated with the content source bundles. In some implementations, other types of content instead of advertisements can be targeted. For example, the targeted content may further include streaming audio/video content, and Really Simple Syndication (RSS) provided content, for example.

In some implementations, the content source bundle authors can be compensated for the content placement. For example, the authors can be compensated through a flat fee or according to the performance of the advertisements, thus incentivizing the content source bundle authors to create the content source bundles.

For example, a sports videogame enthusiast may visit a variety of sports videogame websites and read sports videogame related periodicals. These websites may include blogs focused on sports videogames, sports videogame themed message boards, and sports videogame focused videogame review websites. The websites and periodicals may further include non-sports videogame websites and periodicals that may nonetheless be frequently viewed by sports videogame enthusiasts. For example, sports videogame enthusiasts may visit certain fantasy football websites or sports magazines An advertiser promoting a sports videogame may wish to conduct a targeted advertising campaign for the sports videogame. Typical methods for conducting a targeted advertising campaign include targeting the advertisements to webpages based on a determined context of the webpage. The context of a webpage may be determined, for example, by referring to a known or previously determined context of the webpage, or by analyzing the content of the webpage for keywords. The keywords can be used to determine the likely topic or context of the webpage and to select and display content appropriate targeted content (e.g., advertisements) on the webpage. Thus, the targeted advertisement for the sports videogame might be displayed on websites containing keywords such as "sports" and "videogames."

Such automated targeting, however, may be over inclusive in that the advertisements may be displayed to users having a low interest in the displayed advertisements despite the presence of the particular keywords on the webpage. For example, a role playing game website might receive targeted advertisements related to the sports videogame, but the interest in the sports videogames of the demographic that frequents the role-playing game website may be relatively low, as members of that demographic may be primarily interested in role-playing videogames.

To facilitate a more tailored targeted advertising campaign, the advertisers may contract with content source bundle authors to use content source bundles to identify the websites and other content sources that are relevant to a particular interest or demographic. For example, a sports video game enthusiast may be able to readily identify certain websites and magazines that are frequented by other users sharing the same interests. Continuing the example described above, the sports videogame enthusiast is likely to be a very good source for the websites and periodicals that typical sports videogame enthusiasts frequent. The sports videogame enthusiast may take the list of websites that he or she typically visits (from a browser's "favorites" list or bookmarked files, for example) and generate a content source bundle that includes data that identifies those websites. The enthusiast may also include a list of magazines, newspapers, and television programs that the enthusiasts reads or watches. In some implementations, the sports videogame content source bundle may be presented to advertisers at a content source bundle interface through which advertisers can browse and search for content source bundles that target a desired user group or demographic to use for a targeted advertising campaign. The advertisers may select content source bundles of interest for use in such campaigns.

A content source bundling system that facilitates the creation and use of content source bundles is shown in example environment 100 of FIG. 1. Although the content source bundling system 130 is described with reference to bundling content sources to facilitate the serving of advertisements, the serving of other content items from other content item providers can also be facilitated by content source bundles, e.g., financial news stories, photographs, free games or utilities, etc.

The environment 100 includes a plurality of publisher servers 110a-c. The publisher servers 110a-c store and provide webpage content through the network 115. The publishers 110a-c may further provide non-webpage content such as videogames, magazines, newspapers, and television programs, for example. The publisher servers 110a-c may be implemented as one or more general purpose computers. The network 115 may include a variety of public and private networks such as a public-switched telephone network, a television network, a cellular telephone network, and/or the Internet, for example.

The environment 100 further includes a content server, illustrated as an advertisement server 120. The advertisement server 120 accesses and serves advertisements associated with one or more targeted advertising campaigns. The advertisements may include a variety of advertisement formats and types such as text advertisements, graphic advertisements, audio advertisements and video advertisements, for example.

The advertisement server 120 may further collect and store statistics about the stored advertisements. The collected statistics may describe the performance of the advertisements displayed on the websites or other content sources from the publisher servers 110a-c and/or client devices 102a-c. The collected statistics may include, for example, click-through rate (number of times an advertisement is selected/number of times it is displayed), impression rate (number of times advertisements are shown on a webpage/time), and conversion rate (number of times a click-through of an advertisement results in a goal being achieved (e.g., a purchase)).

The environment 100 further includes a content source bundler 130. The content source bundler 130 stores content source bundles (e.g., content source bundles 132a and 132b) in a data store. In some implementations, the content source bundles may include URLs corresponding to websites associated with the content source bundle as well as descriptions and keywords describing the target user group or demographic of the content source bundle. The content source bundles may also include references to non-website content sources such as newspapers, television programs, and magazines, for example. Other implementations and data structures can also be used, e.g., the content source bundles can be a hash index to reduce file size and/or can include encrypted data.

The content source bundler 130 facilitates the creation of content source bundles by authors. In some implementations, the authors may create the content source bundles using client devices, such as client devices 102a and 102b.

In some implementations, an author may use client device 102a to connect to the content source bundler 130 to generate a content source bundle 132a. The content source bundle 132a may be created at the content source bundler 130 by a user of the client device 102a using a user interface similar to the user interface 300 illustrated in FIG. 3, for example.

In other implementations, an author may use client device 102b to create a content source bundle 132b. The content source bundle 132b may be generated at the client device 102b using a toolbar integrated into an Internet browser, for example. When the content source bundle author visits a website that they would like to include in a content source bundle, they may activate a button on the toolbar resulting in the content source being added to one or more specified content source bundles (e.g., content source bundle 132b). The generated content source bundle 132b may then be uploaded and stored at the content source bundler 130.

The authors may specify one or more of the websites or other content sources from the publisher servers 110a-c to include in a generated content source bundle 132. In some implementations, the authors may further generate a description of the content source bundle 132, such as keywords, to allow advertisers to locate relevant content source bundles. For example, an author may connect to the content source bundler 130 to create a content source bundle 132 directed to food enthusiasts. The author may select one or more food related websites and other content sources from and provide the corresponding URLs or other identifiers to the content source bundler 130. Further, the author may provide a description including keywords that describe the bundle, such as "food", and "restaurant", for example. The generated bundle including description may then be stored at the content source bundler 130.

In some implementations, the content source bundler 130 may further allow advertisers 108a and 108b to select one or more stored content source bundles 132 to associate with a targeted advertising campaign. The advertisers 108a and 108b may browse and select available content source bundles from the content source bundler 130 using a user interface similar to the user interface 500 shown in FIG. 5, for example.

In some implementations, the advertisers 108a and 108b may select one or more content source bundles 132 to use for a targeted advertising campaign using the description or keywords provided by the content source bundle authors or other information gathered from the content source bundles. For example, an advertiser 108 may connect to the content source bundler 130 to find a content source bundle 132 to use for a targeted advertising campaign for a high-end cooking tool. The advertiser may search for a relevant bundle by specifying keywords such as "food" or "cooking". Once the advertiser locates a content source bundle matching one or more of the specified keywords, the advertiser may use the bundle to assist in specifying the advertisements from the advertisement server 120 to use in the targeted advertising campaign (e.g., displayed on the content source s referenced in the selected content source bundle).

Later, a client device, such as client device 102c, can make a request to one of the websites hosted at a publisher server 110 through the network 115. The publisher server 110 can receive the request and retrieve a webpage from the website identified by the request for processing. During processing, one or more scripts corresponding to portions of the webpage reserved for targeted advertisements may be encountered. As part of processing the scripts, the publisher server 110 may make a request for one or more targeted advertisements, or other targeted content, from the advertisement server 120.

The advertisement server 120 can determine if the webpage being processed by the publisher server 110 is referenced in a content source bundle 132 associated with a targeted advertising campaign by communicating with the content source bundler 130. If the website is associated with a content source bundle 132 and a targeted advertising campaign, then one or more advertisements associated with the campaign are sent by the advertisement server 120 to the publisher server 110. The publisher server 110 may receive the advertisements, combine the advertisements with the requested webpage, and send the combined webpage and advertisements to the requesting client device 102*c*.

The content source bundler 130 may further provide performance bundle metrics describing the performance of the content source bundles 132 with respect to associated targeted advertising campaigns. Examples of such metrics include click-through rate, impression rate, and conversion rate. Other metrics can also be used. For example, where the content sources are non-Internet sources, the metrics may include biographical data about the readers or viewers of the content sources and the circulation size of the content source. The collected metrics may be presented to advertisers when browsing available content source bundles to help the advertisers select content source bundles to use with a targeted advertising campaign, for example. The content source bundler 130 may provide other information about the content source bundles 132 including pageview forecasting, contextual analysis information related to the theme of the content source bundle, and category or content display formatting information, for example. In addition, the content source bundler 130 may display the particular websites or content sources making up the content source bundles 132 to allow the advertisers to customize the bundles by adding or removing particular websites and content sources.

The content source bundler 130 may further facilitate payment for the content source bundle by an advertiser (or a third party intermediary) to the author of the content source bundle 132. In some implementations, the payment may be based on the performance of the targeted advertisements displayed on the content sources associated with the content source bundle 132 (e.g., the performance metrics). The payment provided by the advertiser to the author may be based on a variety of performance metrics, including, but not limited to, pay-per-impression, pay-per-click, and pay-per-conversion.

In other implementations, the content source bundle author may be paid based on a percentage of the fees that the advertiser pays to the owners of the content sources referenced in content source bundle. For example, if during some period of time the advertiser pays $50,000 to the owners of the content sources in the bundle for advertisements displayed during the targeted advertising campaign, then the content source bundle author may receive some percentage of the $50,000 as payment for use of the bundle.

In other implementations, the content source bundle author may be paid a flat fee per targeted advertising campaign that uses the author's bundle. For example, if the fee for using a bundle for a targeted advertising campaign is $500, and the content source bundle was used in 10 targeted advertising campaigns, then the content source bundle author would receive $5000.

Figure 6:
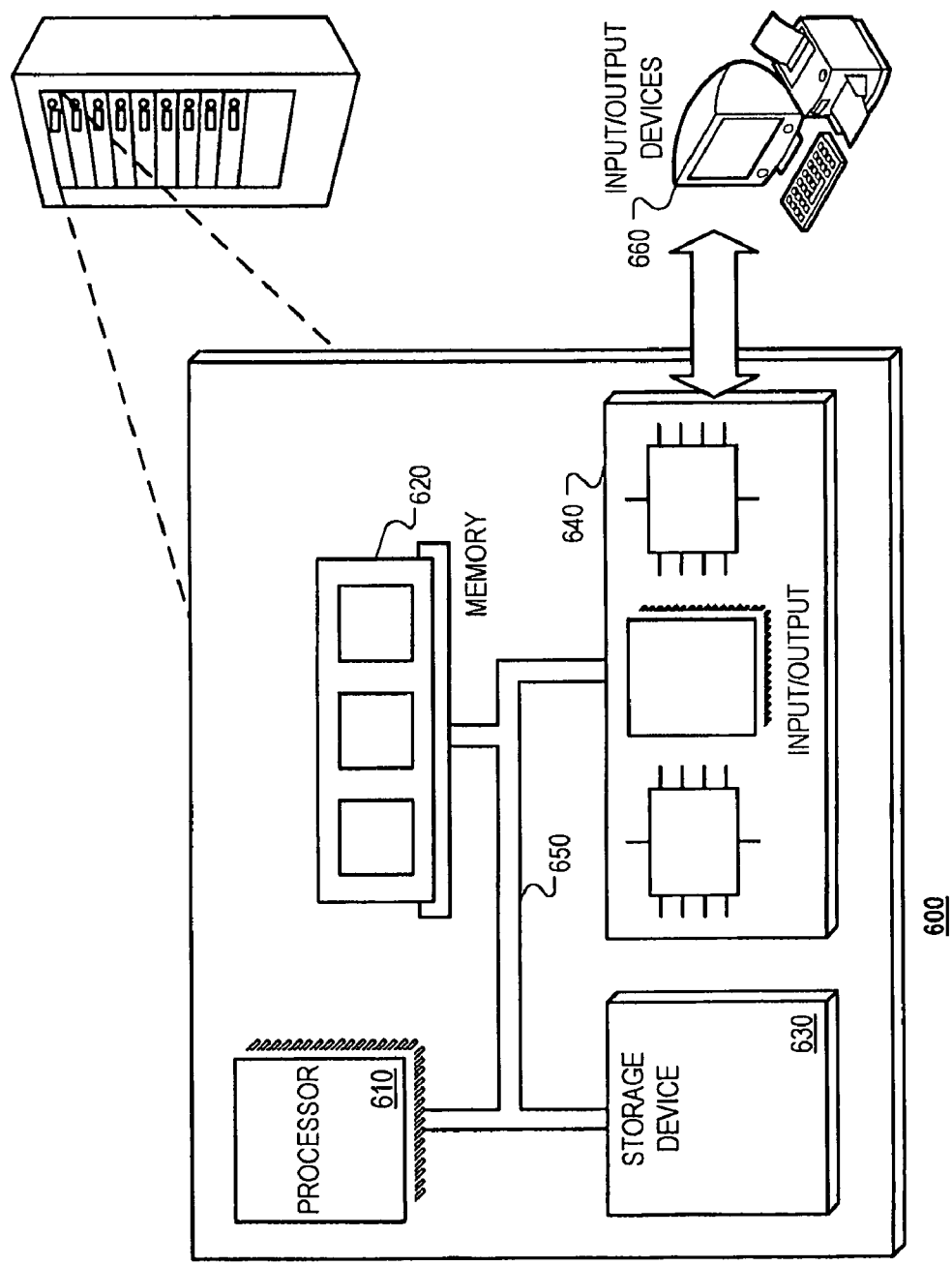
FIG. 6 is a block diagram of an example computer system that can be utilized to implement the systems and methods described herein.

The publisher servers 110*a-c*, the advertisement server 120, and the content source bundler 130 may be implemented on single computer systems, or as a distributed computer system comprising multiple computers (e.g., a server farm). In some implementations, the advertisement server 120, and the content source bundler 130 may be implemented as components of the same computer or as components of a distributed computer system. An example computer system implementation is illustrated in FIG. 6, for example.

Figure 2:
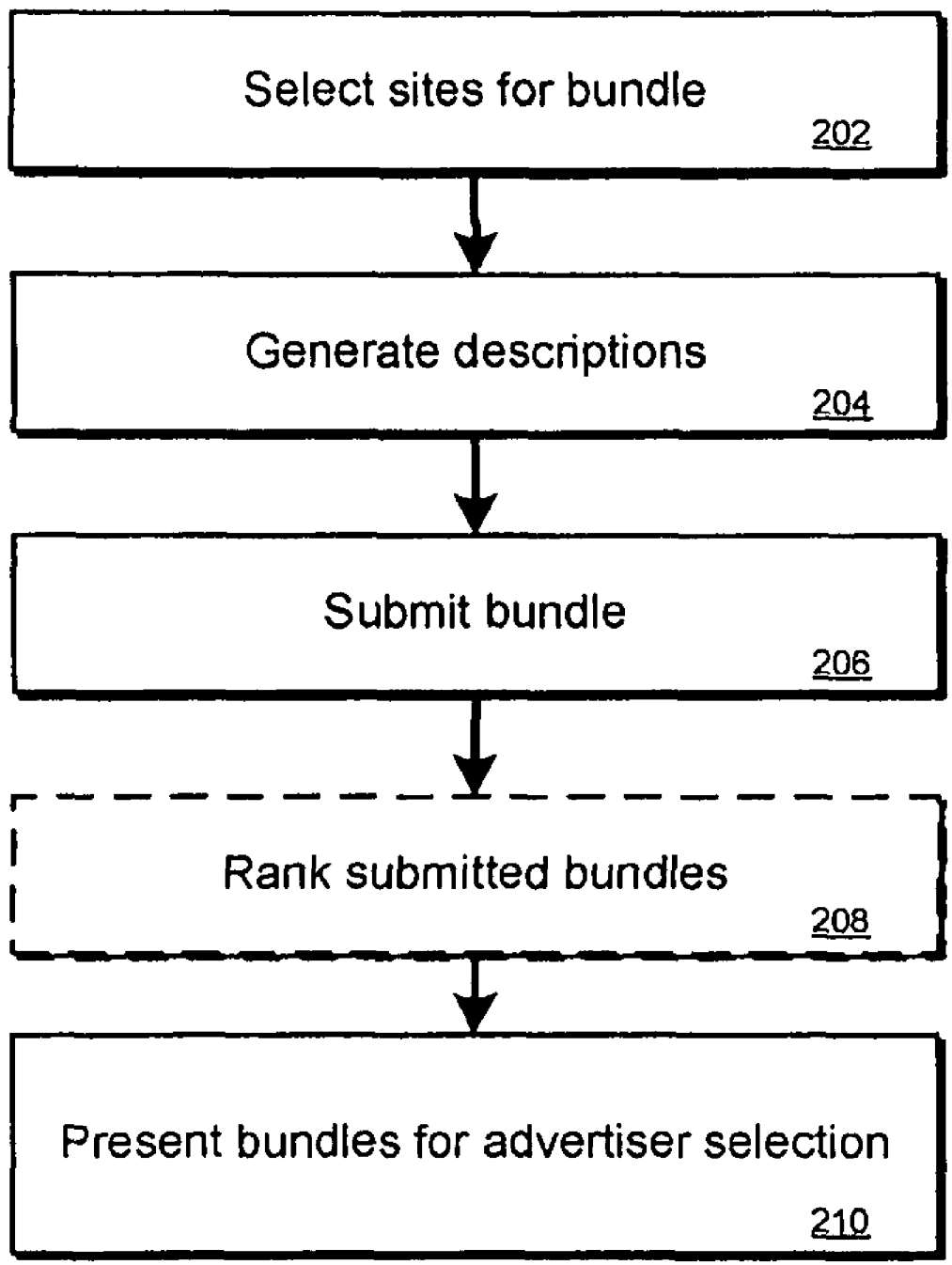
FIG. 2 is a flow diagram of an example process for generating a content source bundle.

FIG. 2 is a flow diagram of an example process flow 200 for generating a content source bundle. The process 200 can, for example, be implemented in the content source bundler 130 of FIG. 1 and in one or more client devices 102 of FIG. 1.

Content sources for a bundle are selected (202). For example, a client device 102 can receive user inputs from an author to select a website that is displayed on a client device for inclusion into a content source bundle. The author may select websites or other content sources related to a particular subject or interest that the author is an expert or enthusiast of. For example, an author who is an automotive enthusiast may select websites that they visit regularly and periodicals that they read regularly to create a content source bundle that may be used to target other automotive enthusiasts. Because the author is an automotive enthusiast, the author may know and regularly view a set of websites and other content sources that are frequented by other automobile enthusiasts. The content source bundles may then be used for a targeted advertising campaign for automobiles.

The author may select a variety of website types for the content source bundle. These may include blogs, commercial websites, message boards, etc. The author may also select a variety of other content sources such as newspapers, television shows, and magazines, for example. The author may select websites and content sources only directed to a particular subject or interest, or the author may include websites and content sources that are likely to be viewed by a person interested the particular subject or topic, but that may not be directed to the particular subject or interest. For example, the author may be a regular visitor to the website of a certain rock band, and may know that many of the fans of the band are also automotive enthusiasts. Because some viewers of the rock band website are also automotive enthusiasts, the author may include the rock band website in the content source bundle.

Figure 3:
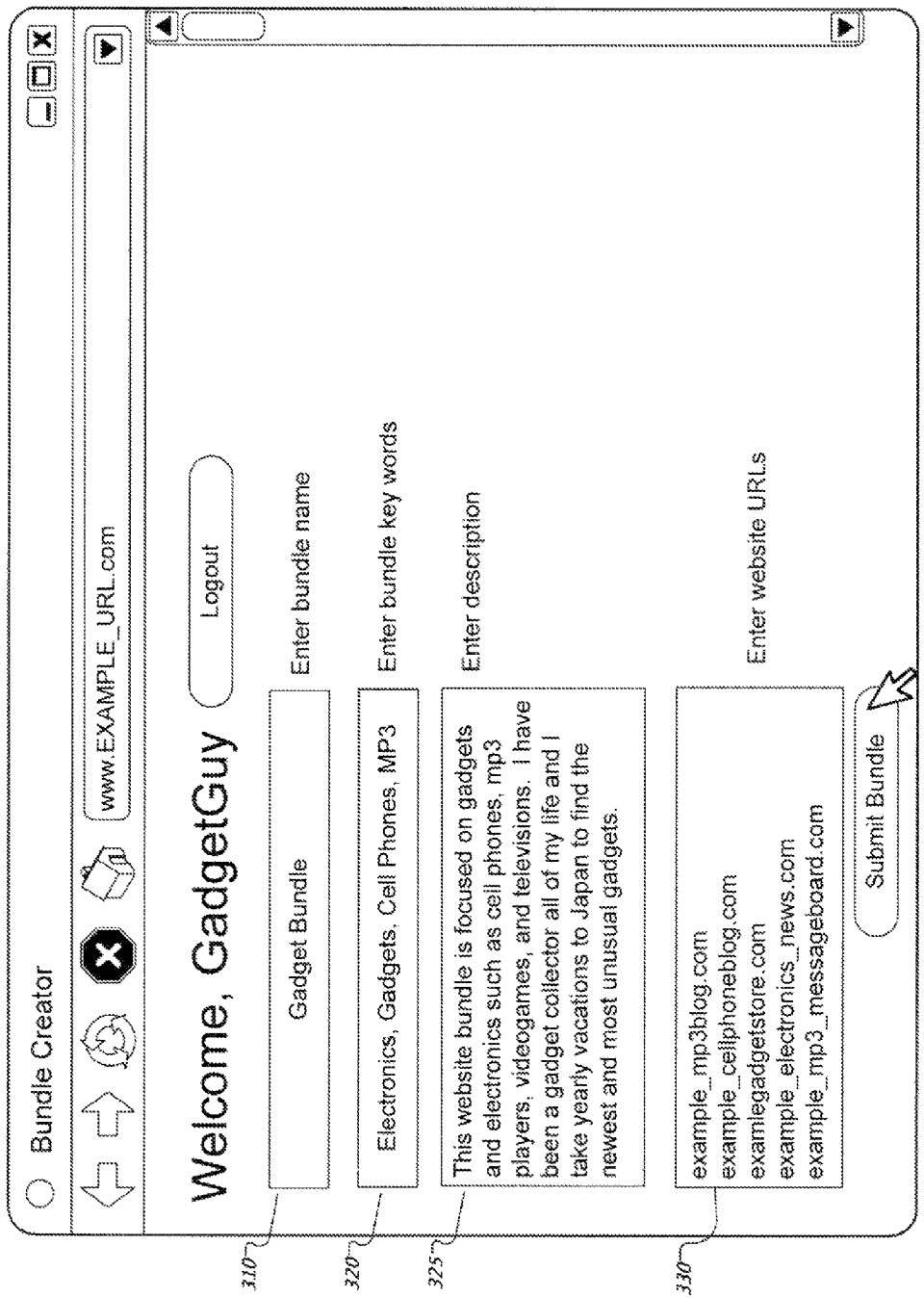
FIG. 3 is an example user interface for creating a content source bundle.

The author may select the websites and other content sources by entering the URLs and other indicators of content sources into a user interface such as the user interface 300 shown in FIG. 3, for example. In some implementations, URLs may be uploaded from a favorites or bookmarks file associated with the author. In other implementations, the URLs may be selected by the author using a specialized program or toolbar associated with the author's Internet browser. When the author visits a website at a URL that the author would like to include in a content source bundle, the author may click a button on the toolbar, resulting in the website being associated with one or more content source bundles that the author is creating, for example.

A description for the content source bundle is generated (204). For example, a client device 102 can receive a content source bundle description through user inputs from an author. To allow advertisers to locate the generated bundle, the author may create a description of the content source bundle. In some implementations, the description may be one or more sentences describing the audience, group, or demographic that the author feels the content source bundle targets. The author may further include personal information describing why the author has the qualifications or knowledge to create the bundle. For example, the author of the content source bundle targeting automobile enthusiasts may explain that they work in the automotive industry, or that they have been interested in automobiles since they were very young.

In some implementations, the author may generate a series of keywords that describe the target audience or focus of the bundle. Advertisers may then search the provided keywords to locate a content source bundle for a particular targeted advertising campaign. In some implementations, suggested keywords may be automatically generated by the content source bundler 130 by determining a context of the content source referenced in the bundle. These generated keywords may then be accepted or rejected by the author depending on the accuracy of the generated keywords.

The content source bundle is created and submitted (206). The content source bundle may be submitted from the client 102a to the content source bundler 130 through a user interface similar to the user interface 300 illustrated in FIG. 3, for example. The author may submit the content source bundle by logging into a bundle creation website or user interface. The content source bundle, and generated keywords or description, is then made available to advertisers who may select the content source bundle for use in targeted advertising campaigns.

The submitted bundle may optionally be initially ranked (208). The content source bundle may be ranked by the content source bundler 130. When a bundle is first created and submitted there may be no data available for the advertisers to objectively determine if the content source bundle will be successful in a targeted advertising campaign. However, many of the individual content source s referenced in the content source bundle may have performance data associated with them that describes the performance of advertisements previously displayed on the content sources. The performance data may be stored at the advertisement 120, for example. The data, where available, may be used to create an initial rating or ranking of the bundle that can be used to help an advertiser determine if they want to use the bundle for their targeted advertising campaign. The data may be retrieved from the advertisement server 120 by the content source bundler 130 and used to create the initial content source bundle ranking.

Other ranking techniques can also be used. For example, the author of the content source bundle may have generated content source bundles that were used for previous or ongoing targeted advertising campaigns. The relative success of the author's previous content source bundles in those advertising campaigns may be used to assign an initial ranking to the new content source bundle. Ranking the content source bundle based on the author's previous content source bundles may be done exclusively, or in addition to, ranking the content source bundle based on the performance of past advertisements. Ranking the content source bundle based on the past performance of an author's bundles may be performed by the content source bundler 130 using performance data associated with the author stored at the content source bundler 130, for example.

In some implementations, the content source bundles may be ranked based on target criteria associated with advertisers. For example, the content source bundles relatedness to one or more known target criteria may be determined using keywords associated with the content sources identified by the bundle, and the similarity of the content sources of the bundle to the content sources of other bundles associated with a particular target criteria.

The generated content source bundle is presented for advertiser selection (210). The content source bundle may be presented to an advertiser 108a by the content source bundler 130 through a user interface similar to the user interface 500 illustrated in FIG. 5, for example. Continuing the example described above, an advertiser may wish to target advertisements to car enthusiasts. Accordingly, the advertiser may access an application or website to search for available content source bundles to use for the targeted advertising campaign.

To locate an appropriate content source bundle, the advertiser may search available bundles by keyword or description. Continuing the example described above, the advertiser may search for bundles containing the keywords "automobile" or "car". Matching content source bundles may then be presented to the advertiser. In some implementations, the advertisers may search for bundles by providing a URL of a website. Keywords associated with the website may then be used to locate relevant bundles. In other implementations, the advertiser may upload or present an advertisement to be used in a targeted advertising campaign. Keywords or context information may be identified from the advertisements and used to search for relevant bundles.

In some implementations, the content source bundles are presented to the advertisers along with various data associated with the content source bundles. For example, the data presented may include a rating or ranking of the content source bundle author based on the performance of other content source bundles created by the author. The data may additionally include statistics about the performance of the content source bundle such as click-through rate, total number of conversions, total number of impressions, etc. As described above, where a bundle is new and has not been used in a targeted advertising campaign, initial statistics may be presented based on the performance of advertisements on the individual websites or other content sources that make up the bundle or based on past performance of content source bundles created by the author, for example. The ranking data may also include a relevancy ranking relating to the advertiser's target criteria based on, for example, keywords associated with bundles, the content sources identified by the bundle, and the similarity of the bundle to other bundles used in for campaigns having the same target criteria.

FIG. 3 is an example user interface 300 for creating a content source bundle. The interface 300 allows an author to create a content source bundle that can be offered to advertisers for use in targeted advertising campaigns. In the example shown in FIG. 3, an author named "GadgetGuy" has logged into, or otherwise accessed, a content source bundle creation website to create a content source bundle.

The user interface 300 includes a bundle name field 310. The author may specify a descriptive name for the content source bundle using the bundle name field 310. Alternatively, or additionally, the content source bundle may be automatically assigned a bundle identification number. In the example shown, the author has given the name "Gadget Bundle" to the new content source bundle.

The user interface 300 may also include a keywords field 320 for entering author created keywords to describe the content source bundle. In the example shown, the author is a gadget and electronics fan and is creating a content source bundle encompassing the various websites and other content sources that the author views or knows that typical gadget and electronics fans may view. An advertiser may then use the content source bundle to target advertisements to other gadget and electronics fans by placing advertisements on the websites and other content sources referenced in the content source bundle. In order for advertisers to locate the bundle, the author may include one or more keywords in the keywords field 320. Advertisers may then search for applicable bundles using the keywords. As shown, the author has provided the keywords "Electronics", "Gadgets", "Cell Phones", and "MP3".

The interface 300 may also include a description field 325. The description field 325 may be used by the author to provide a narrative description of the generated content source bundle including, for example, a description of the group or target demographic of the content source bundle as well as a statement describing why the author believes that they are knowledgeable about the target group or demographic. The description may be used by an advertiser to select a content source bundle. For example, as shown in FIG. 3, the author has provided a brief description of the gadget focus of the content source bundle as well as background information explaining why the author is a gadget authority.

The interface 300 may also include a content source field 330 for entering one or more identifiers of content sources (e.g., URL or periodical name) of content sources for the content source bundle. As shown in FIG. 3, the author is creating a bundle titled "Gadget Bundle" to target users interested in gadgets. Accordingly, the author has entered several identifiers of content sources that users who are interested in gadgets are likely to view. In the example shown, the author has entered the URLs "example_mp3blog.com", "example_cellphoneblog.com", "examplegadgetstore.com", "example_electronics_news.com", and example_mp3_messageboard.com". The author has also entered the name of the magazine "GadgetZine."

After the author has finished entering the keywords, description, and identifiers for the content source bundle, the author may submit the content source bundle by pressing the "Submit Bundle" button. After submitting the content source bundle, the content source bundle may become available for advertisers to use in targeted advertising campaigns as described further with respect to FIG. 4, for example.

Other interface implementations can also be used. For example, a toolbar button can be located on a user's web browser, the selection of which will display a pop-up menu of bundles under development by the user. The user can then add a webpage of interest to a bundle under development. For example, a user may be developing bundles for investors; a first bundle may relate to picking stocks based only on company fundamentals and independent of stock market performance, and a second bundle may relate to purchasing stocks based on market timing and company valuation. As the user finds webpages of interest for each subject, the user can add the webpages to the relevant bundle being developed.

Figure 4:
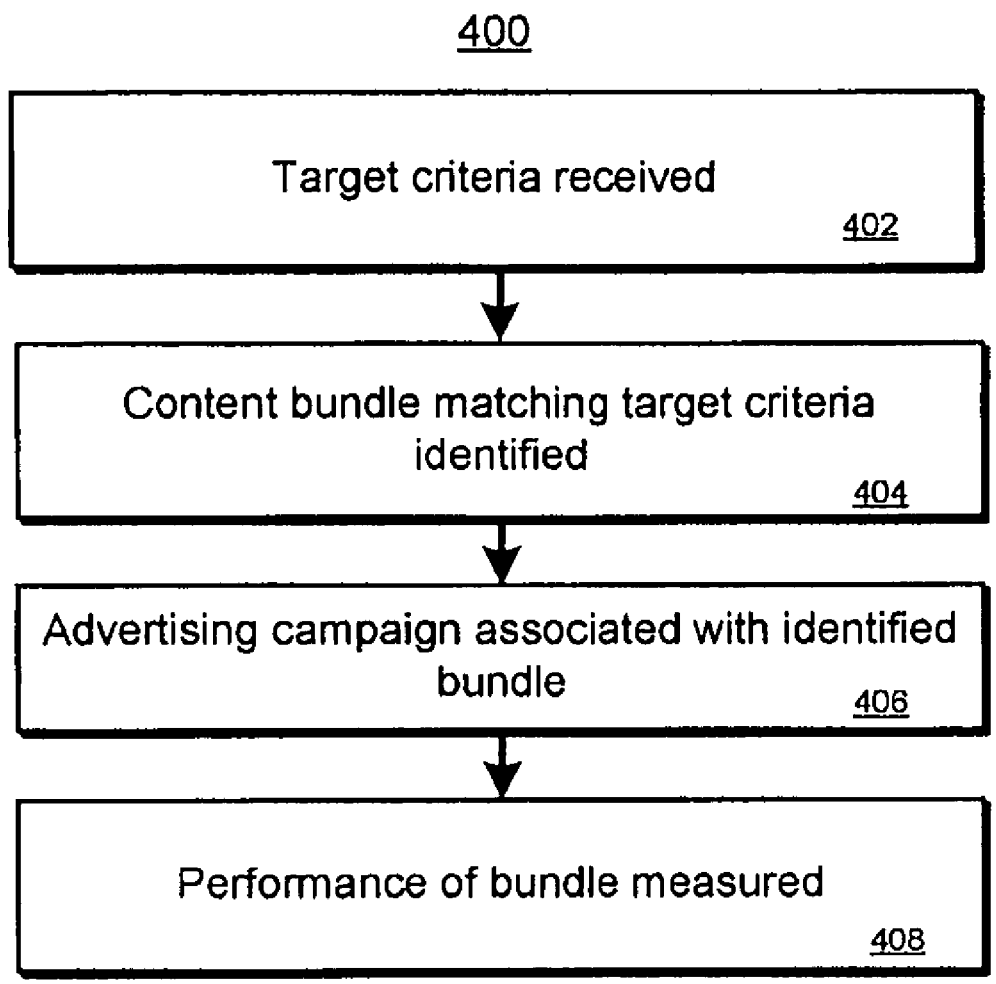
FIG. 4 is a flow diagram of an example process for a targeted advertising campaign using one or more content source bundles.

FIG. 4 is a flow diagram of an example process 400 for a targeted advertising campaign using one or more content source bundles. A target criteria for a content source bundle is received (402). The target criteria may be received by content source bundler 130 from an advertiser 108, for example. The target criteria may comprise keywords. In some implementations, the advertiser may supply an advertisement to be used in the targeted advertising campaign and the target criteria may be determined by analyzing the supplied advertisement (for example, by identifying keywords in the advertisement). In other implementations, the target criteria may be determined by a URL or other content source identifier supplied by the advertiser. The received target criteria corresponds to a targeted advertising campaign that includes one or more advertisements to be displayed on one or more websites or other content sources.

A content source bundle matching the target criteria is identified (404). The content source bundle matching the target criteria may be identified by the bundler 130 by searching for content source bundles matching the target criteria (e.g., searching for content source bundles containing matching keywords).

The targeted advertising campaign is associated with one of the identified content source bundles (406). The content source bundler 130 may receive a selection for one of the identified content source bundles from the advertiser 108. The targeted advertising campaign is then associated with the selected content source bundles so that when webpages identified by the content source bundles are served or delivered to a requesting user, the advertisements from the targeted advertising campaign are placed in the portions of the content sources that are reserved for advertisements. Where the content source bundle includes other content sources such as magazines, the targeted advertising campaign is associated with the sources by contracting or arranging to have the advertisements places in the content source when they are published, for example.

The performance of the targeted advertisement campaign with respect to each of the selected content source bundles is tracked over time (408). The performance of the targeted advertising campaign may be tracked and measured by the advertisers 108, the content source bundler 130, or the advertisement server 120, for example. Some of the collected data may include the impression rate, click-through rate, and completion rate.

In some implementations, the performance data may be used by the content source bundle authors and/or the bundler 130 to add or remove the particular content sources contained in the bundle. For example, the bundle author may remove content sources with low performance ratings. In other implementations, the performance data may be displayed to potential advertisers when the advertisers are considering the content source bundle for use with a targeted advertising campaign. The performance data may be displayed in the user interface 500 as illustrated in FIG. 5, for example.

FIG. 5 is an example user interface 500 for viewing and selecting content source bundles for use in a targeted advertising campaign. The user interface 500 includes a bundle search field 510. Through the bundle search field 510 an advertiser may submit one or more search terms to use to locate a content source bundle matching a target criteria of the targeted advertising campaign.

In the example shown in FIG. 5, an advertiser is searching for one or more content source bundles to use for a targeted advertisement campaign for a new mp3 player. Accordingly, the advertiser has searched for bundles containing the keyword "mp3" by entering "mp3" into the bundle search field 510.

The user interface 500 includes a bundle pane 520. The bundle pane 520 displays available content source bundles that match the provided search terms. The bundle pane 520 may display the identification number of the matching content source bundles, the names of the matching content source bundles, and the keywords associated with the matching content source bundles, for example. After the advertiser selects a displayed content source bundle, further details about the selected content source bundle may be displayed in the bundle details view pane 550.

The bundle details view pane 550 includes further details, metrics, and statistics about the particular content source bundle selected in the bundle pane 520. The bundle details view pane 550 may contain any data that may be helpful for an advertiser to determine if they are interested in using the generated content source bundle in their targeted advertising campaign. The data may describe the content source bundle, or the content source bundle author, for example.

For example, with respect to the content source bundle, the displayed data may include the total number of revenue generated by targeted advertising campaigns using the content source bundle, and the average click-through rate for advertisements targeted using the content source bundle. Where statistics are not available for a particular content source bundle because it has yet to be selected for a targeted advertising campaign, some preliminary statistics or ranking may be displayed based on advertisement performance data previously collected about one or more of the content sources in the content source bundle, for example.

With respect to the content source bundle author, statistics regarding the past performance of content source bundles created by the author or owner may also be displayed with the matching content source bundles. In some implementations, a ranking may be assigned to the content source bundle author. The ranking may be generated by the content source bundler 130, for example. The ranking may be based on the number of content source bundles the author has created, the number of advertising campaigns that used content source bundles created by the author, the performance of advertising campaigns using content source bundles created by the author, and advertiser submitted rankings. In some implementations, advertisers may submit reviews and comments about the author and the author's content source bundles.

In the example shown, the data includes a user rating of the content source bundle author, the keywords and description provided by the author, the number of active advertising campaigns using the content source bundle, the click-through rate and total hits for the content source bundle for various periods of times, and the total advertisement revenue generated by the content source bundle.

Other interface implementations can also be used. For example, the user interface 500 may be implemented as a stand alone application, such as a toolbar, for example, executing on one of client devices 102a-c.

FIG. 6 is a block diagram of an example computer system 600 that can be utilized to implement the systems and methods described herein. For example, all of content servers 110a-c, advertisement server 120, content source bundler 130, and client devices 12a-c may be implemented using the system 600.

The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method comprising:
receiving data specifying content sources that a user has identified for inclusion in a same content source bundle, the specified content sources being online resources with which advertisements are presented;
generating, by one or more computers, a content source bundle that includes references to the specified content sources, the content source bundle also including data indicative of keywords that are descriptive of at least one of the specified content sources of the content source bundle;
providing, by one or more computers, data that cause presentation of the content source bundle to an advertiser;
receiving, by one or more computers and from the advertiser, data indicating that advertisements provided by the advertiser are eligible for presentation with the specified content sources of the content source bundle; and
providing data that cause an advertisement provided by the advertiser to be presented with one or more of the specified content sources of the content source bundle.

2. The method of claim 1, further comprising:
determining performance measures for the content source bundle based, at least in part, on performance measures of advertisements that are presented with the specified content sources; and ranking the content source bundle relative to other content source bundles according to the performance measure of the content source bundle, and performance measures that are associated with the other content source bundles.

3. The method of claim 1, further comprising:
determining performance measures for the user based, at least in part, on performance measures of advertisements presented with a previously generated content source bundle, the previously generated content source bundle including other content sources that the user identified for inclusion in a same content source bundle, and
ranking the content source bundle according to the measured performance measures for the user.

4. The method of claim 1, further comprising:
receiving performance data for the content sources of the same content source bundle; and
ranking the content source bundle relative to other content source bundles according to the performance data of the selected content sources assigned to the bundles.

5. The method of claim 1, wherein receiving data specifying content sources comprises receiving the data specifying the content sources through a toolbar that is installed in a browser at a user device.

6. The method of claim 1, further comprising:
in response to receiving data indicating that advertisements provided by the advertiser are eligible for presentation with the specified content sources, associating the advertisements with the content source bundle so that when a content source from the content source bundle is requested by a user device, one of the advertisements is provided in response to the request.

7. The method of claim 1, further comprising compensating the user based on performance of the content source bundle.

8. The method of claim 7, wherein the content sources are websites, and further wherein performance of the content source bundle is determined by one of a number of clicks received, impressions made, or conversions attributable to inclusion of the advertisements on the websites from the content source bundle.

9. The method of claim 1, further comprising:
receiving, from the advertiser, one or more terms; and
determining that the content source bundle includes data indicative of a keyword that matches one of the terms.

10. The method of claim 1, further comprising providing data that cause presentation of a toolbar at a user device, the toolbar including user interface elements that enable the user to specify one or more content sources for inclusion in the same content source bundle.

11. A system comprising:
a data store storing content source bundles, each content source bundle specifying a set of content sources that have been identified as belonging to the content source bundle, of the content sources being online resources with which advertisements are presented; and
a content source bundler including one or more computers, the content source bundler being configured to interact with the data store and further being configured to perform operations including:
receiving data specifying content sources that a user has identified for inclusion in a same content source bundle, the specified content sources being online resources with which advertisements are presented;
generating a content source bundle that includes a reference to the specified content sources, the content source bundle also including data indicative of keywords that are descriptive of at least one of the specified content sources of the content source bundle;
providing data that cause presentation of the content source bundle to an advertiser;
receiving, from the advertiser, data indicating that advertisements provided by the advertiser are eligible for presentation with the specified content sources of the content source bundle; and
providing data that cause an advertisement provided by the advertiser to be presented with one or more of the specified content sources of the content source bundle.

12. The system of claim 11, wherein the content source bundler is further configured to perform operations including:
determining performance measures for the user based, at least in part, on performance measures of advertisements presented with a previously generated content source bundle, the previously generated content source bundle including other content sources that the user identified as belonging to a same content source bundle, and
ranking the content source bundle according to the measured performance measures for the user.

13. The system of claim 11, wherein the content source bundler is further configured to perform operations including:
determining performance measures for the user based, at least in part, on performance measures of advertisements presented with a previously generated content source bundle, the previously generated content source bundle including other content sources that the user identified for inclusion in a same content source bundle, and
ranking the content source bundle according to the measured performance measures for the user.

14. The system of claim 11, wherein the content source bundler is further configured to perform operations including:
receiving performance data for the content sources of the same content source bundle; and
ranking the content source bundle relative to other content source bundles according to the performance data of the selected content sources assigned to the bundles.

15. The system of claim 11, wherein the content source bundler is further configured to perform operations including receiving the data specifying the content sources through a toolbar that is installed in a browser at a user device.

16. The system of claim 11, wherein the content source bundler is further configured to perform operations including in response to receiving data indicating that advertisements provided by the advertiser are eligible for presentation with the specified content sources, associating the advertisements with the content source bundle so that when a content source from the content source bundle is requested by a user device, one of the advertisements is provided in response to the request.

17. The system of claim 11, wherein the content source bundler is further configured to perform operations including compensating a content source bundle owner the user based on performance of the content source bundle.

18. The system of claim 17, wherein the content sources are websites, and further wherein performance of the content source bundle is determined by one of a number of clicks received, impressions made, or conversions attributable to inclusion of the advertisements on the websites from the content source bundle.

19. The system of claim 11, wherein the content source bundler is further configured to perform operations including:
receiving, from the advertiser, one or more terms; and
determining that the content source bundle includes data indicative of a keyword that matches one of the terms.

20. The system of claim 11, wherein the content source bundler is further configured to perform operations including providing data that cause presentation of a toolbar at a user device, the toolbar including user interface elements that enable the user to specify one or more content sources for inclusion in the same content source bundle.

* * * * *

UNITED STATES PATENT AND TRADEMARK OFFICE
CERTIFICATE OF CORRECTION

| | | |
|---|---|---|
| PATENT NO. | : 8,112,308 B1 | Page 1 of 1 |
| APPLICATION NO. | : 12/187036 | |
| DATED | : February 7, 2012 | |
| INVENTOR(S) | : Ho et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 701 days.

Signed and Sealed this
Twenty-sixth Day of June, 2012

David J. Kappos
*Director of the United States Patent and Trademark Office*